United States Patent [19]

Brockman et al.

[11] 4,186,347
[45] Jan. 29, 1980

[54] RADIO FREQUENCY ARRAYING METHOD FOR RECEIVERS

[76] Inventors: Robert A. Frosch, Administrator of the National Aeronautics and Space Administration, with respect to an invention of Milton H. Brockman, Glendale; Mahlon F. Easterling, Altadena, both of Calif.

[21] Appl. No.: 956,160

[22] Filed: Oct. 31, 1978

[51] Int. Cl.² .............................................. H04B 7/02
[52] U.S. Cl. .................................... 325/305; 325/307; 325/419
[58] Field of Search ................ 325/305, 307, 419–421, 325/56, 60, 167, 171

[56] References Cited

U.S. PATENT DOCUMENTS

| | | | |
|---|---|---|---|
| 3,311,832 | 3/1967 | Schrader | 325/305 |
| 3,383,599 | 5/1968 | Miyagi | 325/419 |

*Primary Examiner*—Robert L. Griffin
*Assistant Examiner*—Alexander Gerasimow
*Attorney, Agent, or Firm*—Monte F. Mott; John R. Manning; Paul F. McCaul

[57] ABSTRACT

A method and apparatus for increasing the signal-to-noise ratio of a receiving facility for coherent frequency reception by arraying receiving systems using separate antennas for each, or one antenna for all systems. One system is operated with a carrier tracking loop to provide a first local oscillator frequency for the first and all other systems arrayed, with individual tracking loops in all other systems operated at IF for tracking out any phase differences due to separate group delays using an adjustable phase shifter for a second reference (REF. 2) to compensate for different group delays in the antenna and low-noise amplifier of each of the other systems. The second IF output of all systems are summed into the first system. This technique may also be used when two systems are arrayed to an antenna designed for circular or linear polarization diversity reception to effectively provide the same signal-to-noise ratio for both polarized signal transmission channels that would result from matched polarization. An arrangement adapted to high rate telemetry reception is disclosed. With additional components, the same arrangement is adapted to provide low rate telemetry reception as well.

20 Claims, 9 Drawing Figures

4,186,347

RADIO FREQUENCY ARRAYING METHOD FOR RECEIVERS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to system for coherent radio frequency reception, and more particularly to method and means for increasing the sensitivity of a receiving facility.

In the process of communication with spacecraft, it is sometimes necessary to achieve reception of very low power signals. The signal-to-noise ratio is often so low that signal detection is difficult. To make reception easier, it would be necessary to increase the sensitivity of the receiver, i.e., lower the detection threshold. That would be a difficult task when the receiver design is already at the maximum sensitivity possible with state-of-the-art devices, such as low-noise maser amplifiers mounted immediately behind the horn of a Cassegrain reflector antenna.

SUMMARY OF THE INVENTION

A basic concept of the present invention is to increase the sensitivity of a receiving facility for coherent radio frequency reception by arraying receiving systems using a single antenna, or arraying stations including receiving systems and their antennas. The IF signals from the receivers are combined such that signal-to-noise ratio improvement of 2 to 3 dB is obtained for just two stations arrayed, relative to a single receiving station, and greater improvement for more than two arrayed stations. The signal-to-noise ratio improvement is limited only to the number of systems that can be combined practicably. The system for combining receivers from separate stations includes use of the output of the RF carrier tracking loop of the first receiving system to provide an RF local oscillator signal for the other receiving systems in the array thereby to control all of them to track the same received signal. Individual carrier tracking loops in the other receiving stations operate at IF and track out phase differences due to the fact that other stations may have separate antennas, and have at least separate preamplifiers and possibly antennas as well, with difference phase delays. The IF carrier tracking loops operate narrow-band (for example, 0.01 of the RF carrier tracking loop of the first receiving system). The IF signal outputs of all the receiving systems thus properly phased are summed with the IF signal in the first system to provide the improved signal-to-noise ratio.

In a system for diversity circular or linear polarization reception from a single antenna with its associated feed, two systems are arrayed, one for horizontal or left circular polarized reception and one for vertical or right circular polarized reception. One system is operated with a carrier tracking loop and the other with a tracking loop operating at IF. Both IF signals are summed in one system for signal-to-noise ratios in both receivers that are effectively the same as that obtained for matched polarization.

In a radio frequency arraying system for high rate telemetry reception, the preferred implementation of an RF arrayed receiver system includes setting the signal level of the summed IF in the first (master) receiving system to provide the required level for the telemetry subcarrier spectrum of the first receiving system with respect to the other systems; adjusting the closed loop noise bandwidth of the other systems to compensate for low carrier signal-to-noise ratio relative to the first receiving system and including a distribution amplifier to feed the second IF signal to the tracking loops of each respective receiving system and to a separate telemetry subcarrier channel of broad bandwidth in each receiving system.

In a radio frequency arraying system for low rate telemetry reception and radiometric tracking, the preferred implementation includes maintaining the low threshold of the array utilizing as a filter a local oscillator tracking loop operating at a fixed narrow-band noise bandwidth in each receiving system except the first (master) receiving system for reducing the phase noise at the summing junction, thereby preserving the master receiving system threshold as the combined receiving system threshold. As an example, a narrow-band noise reduction loop having a fixed bandwidth of 0.01 the threshold (design point) noise bandwidth of the first receiving system provides filtering such that the cumulative phase noise effect is kept small relative to the phase noise on the first local oscillator. The filter loop consists of an additional second mixer in the additional receiver with the second local oscillator fed to this additional second mixer through the narrow band phase locked local oscillator tracking loop. The phase noise on the output of the local oscillator tracking loop is small compared to the phase noise at its input.

The novel features of the invention are set forth with particularity in the appended claims. The invention will best be understood from the following description when read in conjunction with the accompanying drawings.

DESCRIPTION OF PREFERRED EMBODIMENTS

Figure 1:
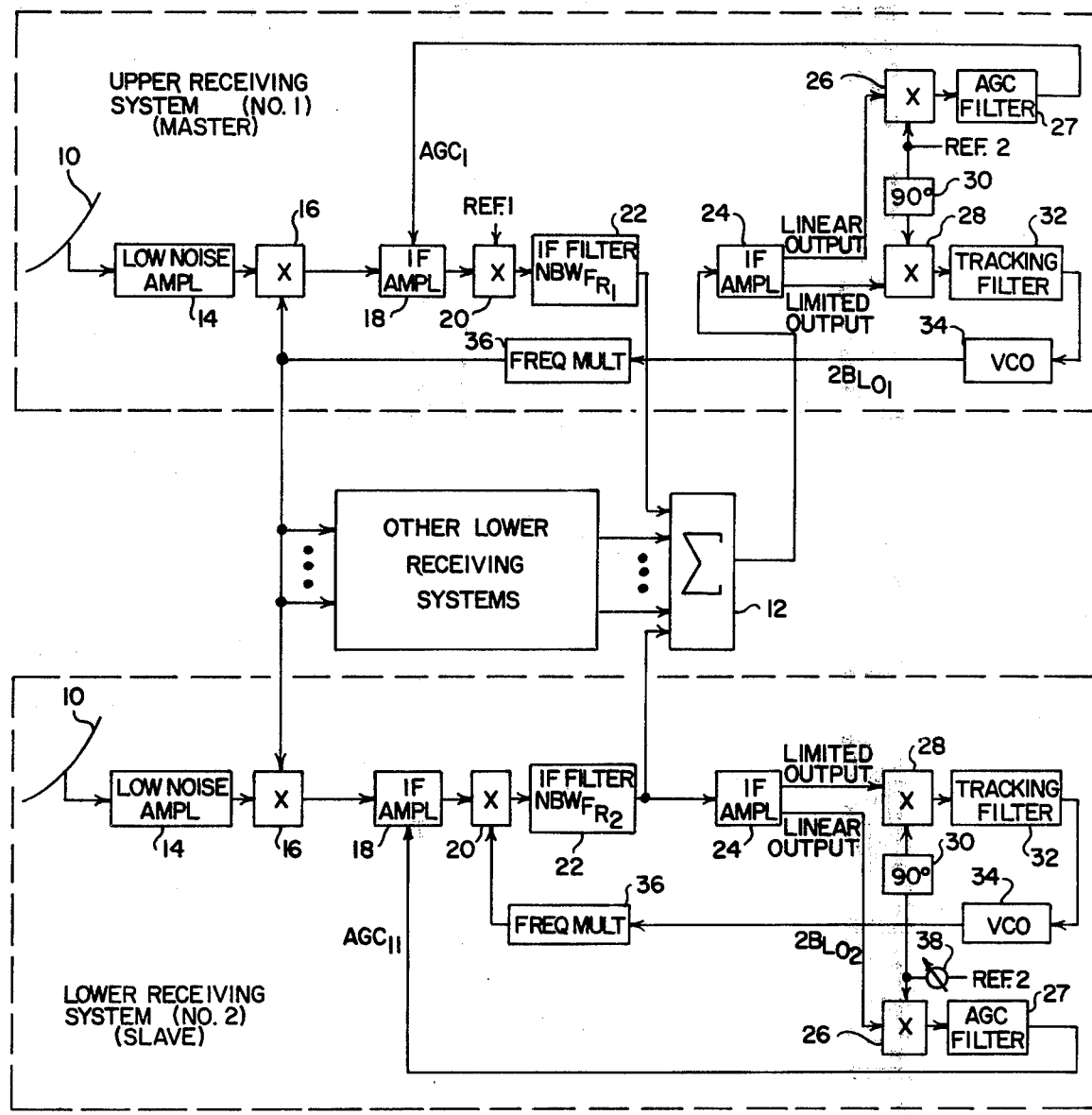
FIG. 1 is a block diagram of a system embodying the basic concept of the invention.
Figure 2:
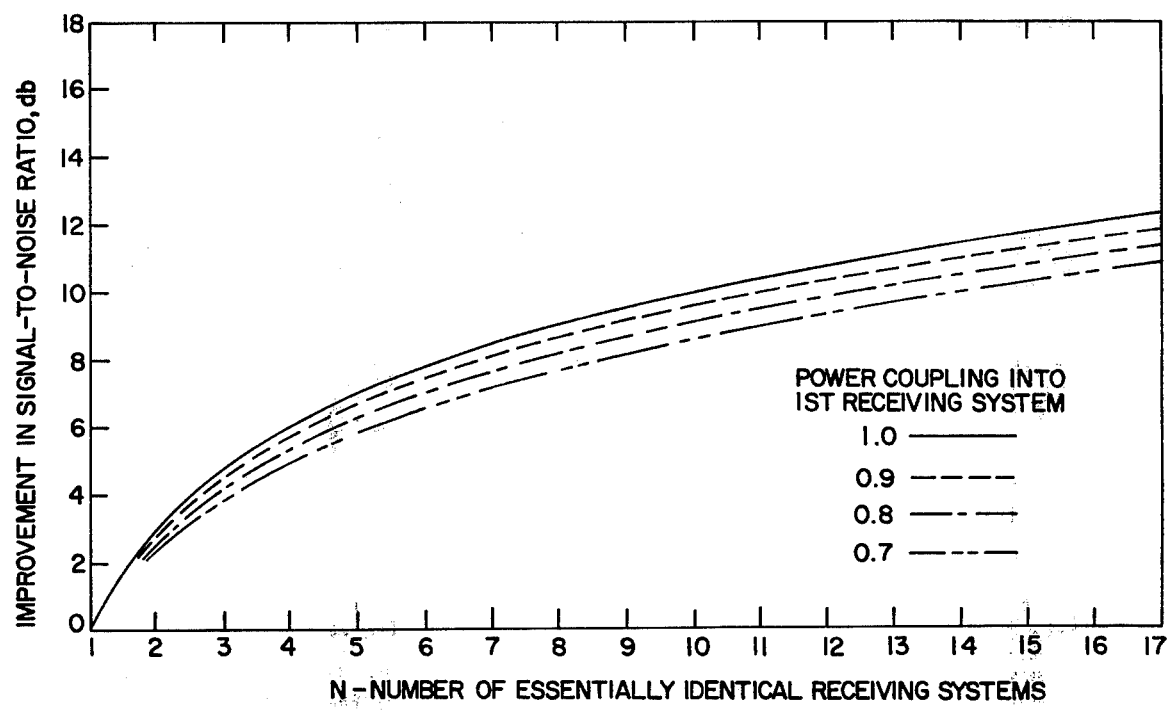
FIG. 2 is a graph illustrating the signal-to-noise improvement for radio frequency arraying of receiving systems in accordance with the concept illustrated in FIG. 1.

Referring now to FIG. 1, the concept of the invention will be described with reference to two essentially identical receiving systems, but it should be clearly understood that any number of systems may be arrayed. Generally, the improvement in signal-to-noise ratio for carrier and doppler tracking will improve with the number, as shown in FIG. 2, but in practice the most improvement is realized with the addition of the first six or seven systems.

Each receiving system can be fed from its own antenna 10. Alternatively, receiving systems may share the same antenna to provide a signal-to-noise improvement which will be modified by the ratio of that portion of receiver noise which is statistically independent, to the total system noise.

The components common to every system will be designated by the same reference numeral in each system. This is for ease in understanding the invention. To avoid confusion as to which particular element is being referred to, the text will indicate whether its the upper (No. 1) system or the lower (No. 2) system. Consider the upper receiving system, and assume for the moment that the input to a summing junction 12 (a signal combining device) from the lower receiving system is removed and replaced with a passive termination which matches the source impedance provided by the lower receiving system. The upper receiving system contains a second order RF carrier tracking loop which coherently tracks the phase of its received radio frequency carrier.

The loop, which follows a low noise amplifier 14, such as a maser, is comprised of: a heteradyne mixer 16 which reduces the receiver carrier signal to an intermediate frequency (IF); an IF amplifier 18; a heteradyne mixer 20 which mixes a first reference (REF. 1) with the IF to obtain a new IF bandwidth signal which is passed by an IF filter 22; an IF amplifier 24 having two outputs, a linear output to a coherent amplitude detector 26, which mixes with a second reference signal (Ref.2) directly to provide for automatic gain control (AGC) to the first IF amplifier 18 via an AGC filter 27; and to a phase detector 28 which mixes with Ref. 2 in quadature through a 90° phase shifter 30 to provide phase voltage control of a local (VCO) oscillator 34. The VCO is operated at a lower frequency than required to mix with the carrier input signal, so it is increased in frequency by an appropriate factor in a frequency multiplier 36.

The output of this RF carrier tracking loop in the upper receiving system is also provided to the lower receiving system so as to phase track its received carrier, which is after all the same as that of the upper receiving system. However, since the two receiving systems have separate lownoise amplifiers and can have separate antennas, there is a differential phase effect which must be tracked out. The carrier tracking loop in the lower receiving system operating on the intermediate frequency (IF) takes care of tracking out of any differential phase effects with the tracking loop of the second receiving system. This tracking loop is also a second order loop that operate with a closed-loop noise bandwidth which is a small fraction (about 0.01) of the carrier tracking loop in the upper receiving system. The difference between the upper (first) receiving system and the lower (second) receiving system, and all other receiving systems added, is that the tracking loop for the upper one serves all the lower ones for phase tracking at the carrier frequency, and the tracking loop for the lower one, serves only the lower one for tracking out differential phase effects at the intermediate frequency. There is one other minor difference in the lower system, which is the addition of an adjustable phase shifter 38 for the second reference (REF 2) applied to the mixer 26 for AGC control, and through the phase shifter 30 to the mixer 28 for phase tracking the IF, as will be presently described more fully.

Consider now FIG. 1 with the input at IF from the lower receiving system reconnected to the summing junction 12 and the IF tracking loop properly phased relative to the upper receiving system. Signal-to-noise ratio improvement is now realized in the carrier tracking loop of the upper receiving system and consequently in the lower receiving system also. Proper phasing of the lower receiving system is obtained with both receivers on manual gain and with adjustment of a phase shifter 38 for maximum output from the coherent amplitude detector 26 which provides the input voltage to the AGC filter 27 in the upper receiver. Each receiver generates and operates with its own automatic gain control (AGC). Connection of additional receiving systems to provide further improvement in carrier signal-to-noise ratio is indicated. Proper phasing of these additional receiving systems relative to the upper receiving phase (#1) is accomplished in the same manner as described above.

The signal-to-noise ratio improvement that can be realized is dependent on the coupling that can be obtained into the upper receiving system from the other receiving systems. Consider the situation where each receiving system has its own antenna with equal gains. For the case of two receiving systems as shown with equal system noise temperatures, unity coupling provides 3 db improvement in signal-to-noise ratio while a power coupling of 0.90 (voltage 0.95) provides 2.79 dB, 0.80 (voltage 0.89) provides 2.55 dB, and 0.7 (voltage 0.84) provides 2.30 dB improvement in signal-to-noise ratio.

FIG. 2 illustrates the improvement in signal-to-noise ratio obtainable in the first (upper) receiving system for N essentially identical receiving systems, each with its own antenna, for various couplings. For non-identical antennas and/or different system noise temperatures, proper weighting would be required at the summing junction to optimize signal-to-noise ratio improvement. The first receiving system can be considered the master receiving system with the other receiving systems slaved to it.

Figure 3:
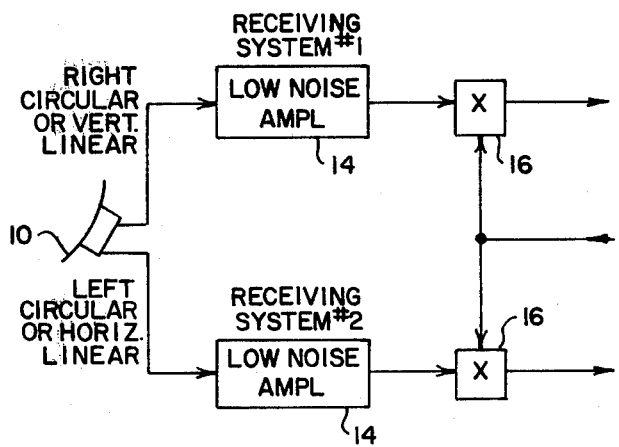
FIG. 3 illustrates the application of the basic concept illustrated in FIG. 1 to radio frequency arraying for circular or linear polarization diversity reception using two systems arrayed to an antenna designed for receiving two distinctly polarized transmissions simultaneously.

FIG. 3 illustrates the method for carrier and Doppler tracking by which two receiving systems can be arrayed to achieve radio frequency signal-to-noise improvement for simultaneous polarization diversity reception from a single antenna with its associated feed. The systems are the same as in FIG. 1, but only two systems are included, and both are connected to the same antenna. One system is connected to receive horizontal or right circular polarized carrier signals, and the other to receive vertical or left circular polarized signals. When two systems are arrayed to an antenna designed for receiving right circular and left circular polarized transmission simultaneously, the summed IF effectively provides the same signal-to-noise ratio for a linearly polarized signal transmission at any unknown polarization angle that would result from matched polarization (of the received transmission and antenna). Conversely, when two systems are arrayed to an antenna designed for receiving vertical linear and horizontal linear polarized transmission simultaneously, the summed IF effectively provides the same signal-to-noise ratio for a right circular or left circular polarized signal transmission that would result from matched polarization. It often occurs that the polarization sense or angle is not known to the receiving system. This technique provides reception with the same signal-to-noise reception in both channels as though the polarization sense or angle were known and the antenna properly oriented.

Figure 4:
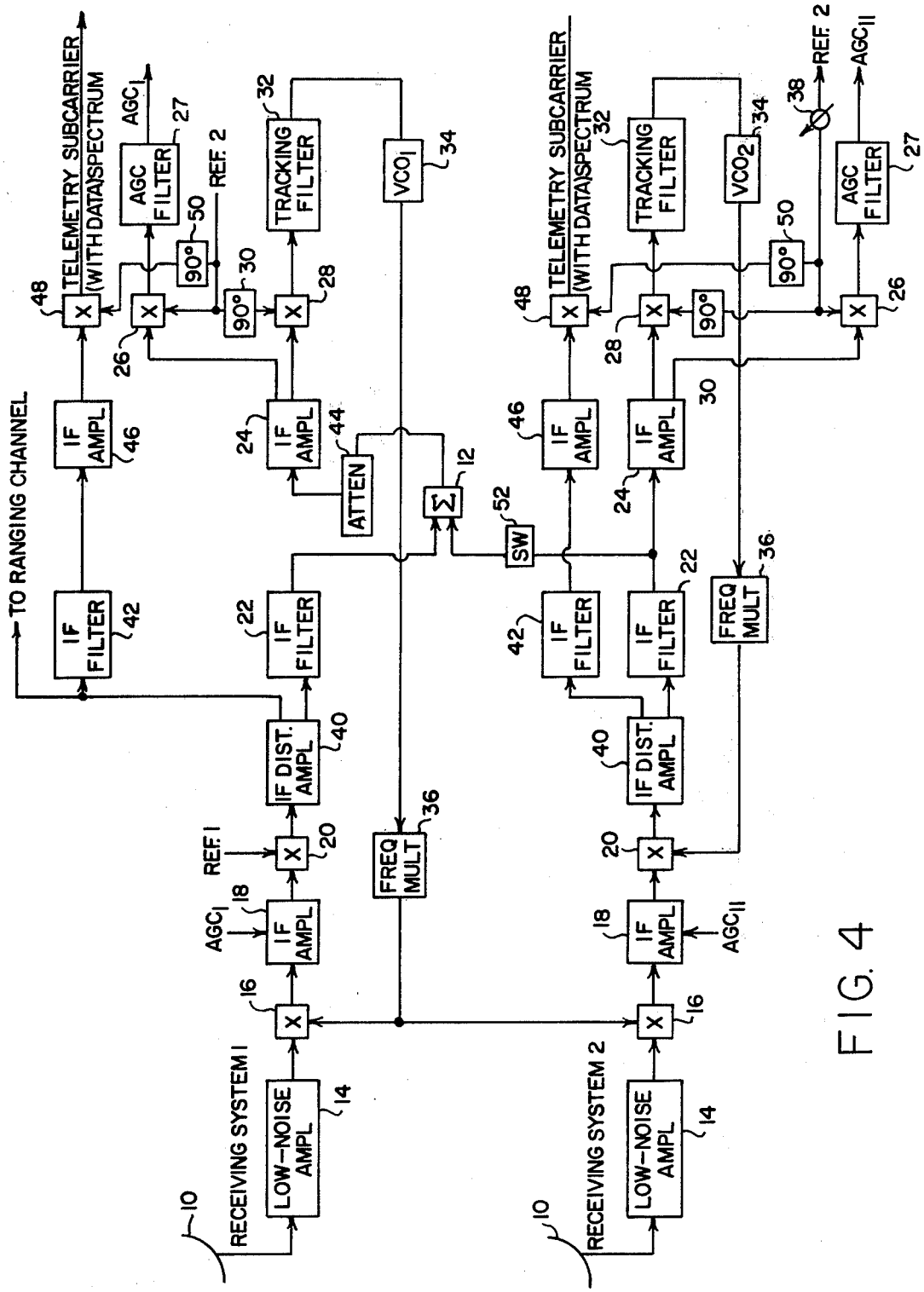
FIG. 4 is a block diagram of a preferred embodiment of a radio frequency arraying system for high rate telemetry reception.

FIG. 4 illustrates an application of the present invention in a radio frequency arraying system for high rate telemetry reception. Other applications would include, for example, ranging reception. As with the basic concept illustrated in FIG. 1, two receiving systems are shown to illustrate this embodiment. However, additional receiving systems can be added to increase the signal-to-noise improvement for RF carrier arraying. Upon comparing the upper and lower receiving systems with the corresponding systems of FIG. 1, it can be seen that they differ in that here a distribution amplifier 40 is included in each receiving system with a gain sufficient to feed both IF filters 22 and 42. The additional second IF filter 42 has sufficient bandwidth to pass the telemetry sidebands. The original IF filter 22 is narrow band relative to the telemetry sidebands and consequently filters the sidebands out. It should be noted that since the gain from the filter 22 to the AGC detector is constant, minus the summing junction (12) loss, an attenuator 44 at the input to the second IF amplifier in the upper receiving system provides a means for setting the signal level at the output of the IF distribution amplifier 40 in the upper receiving system to provide the required output level for the telemetry subcarrier spectrum in the upper receiving system when RF carrier arraying with lower receiving systems.

Proceeding in the lower receiving system as above (for the upper receiving system), the output signal of the first IF amplifier 18 may have the signal-to-noise ratio nearly equal to that at the corresponding point in the upper receiver, although that is not necessarily so, nor a requirement of this invention. The second local oscillator signal in the lower receiving system is derived from the VCO 34 through the frequency multiplier 36, as in FIG. 1. Its phase is modified by differences in carrier phase, as pointed out in the discussion relative to FIG. 1. The phase estimate for this second oscillator is derived from a phase locked loop whose closed loop noise bandwidth is a small fraction of the closed loop noise bandwidth of the RF carrier phase tracking loop. Hence the noise on the phase estimate is much less than that on the phase estimate of the first local oscillator signal from the VCO 34 in the upper system. Note that if the carrier signal-to-noise ratio in the lower receiving system were significantly less than that in the upper receiving system, this effect could be offset by making the closed loop noise bandwidth in the lower receiving system a still smaller fraction of that in the upper receiving system.

The second IF distribution amplifier 40 on the lower receiver system provides its output to the IF filter 22 and to the telemetry IF filter 42. The filter 22 in this lower receiving system has the same noise bandwidth as IF filter 22 in the upper receiving system by design. The output of the filter 22 in the lower system is provided as an input to the summing junction 12 as well as to the RF carrier loop and AGC in the lower system as in FIG. 1. Note that the phase shift from the output of IF filter 22 to the phase detector 28 which provides the error signal to the tracking filter 32 is a constant by design. Consequently the phase shifter 38 provides a means for setting the RF phase of the output of filter 22 equal to the RF phase of the output of the corresponding IF filter in the upper system at the junction 12. The second IF amplifier (24) gain is designed so that the signal level can be set as required relative to the signal level in the upper system at the input to the summing junction 12.

Before proceeding further with a discussion of the organization and operation of the system in this exemplary application of high-rate telemetry reception, it should be noted that the point of signal-to-noise ratio improvement is in the output of the summing junction 12 which contributes to the carrier tracking loop of the upper system to which the lower stations are slaved by virtue of all the lower systems receiving their first local oscillator signal from the frequency multiplier for the upper system. The tracking filter output of each lower system is then used to track out any phase difference in the respective lower systems through adjustment of the phase shifter 38 for the second reference (REF. 2). A useful output from the total system may thus be taken from the output of the summing junction 12, but in this high-rate telemetry reception application, a useful output is taken from the additional second IF filter 42 through an amplifier 46 and a telemetry channel phase detector (mixer) 48 which receives the same reference signal (REF. 2) as the coherent phase detector 28, but through a separate 90° phase shifter 50. The channel phase detector 48 of each receiver system provides substantially the same telemetry subcarrier (with data) spectrum that may be separately processed, or preferably combined through a baseband signal combiner.

In operation, the multireceiver system is operated with just the upper receiver for acquisition of the carrier while the frequency multiplier 36 is swept or set in frequency to the expected (or predicted) reception frequency. That is readily accomplished by opening a switch 52 to a disconnect the lower system from the summing junction. The carrier tracking loop of the upper system then operates in the usual manner for carrier tracking with a second order RF carrier phase tracking loop which utilizes a band pass limited output from the IF amplifier 24 and a sinusoidal phase detector 28. Once acquisition of the carrier is completed, the carrier tracking loop in the one or more lower systems are acquired by setting the oscillator (VCO) 34 so that the frequency multiplier 36 output is at a frequency equal (zero beat frequency) to the first reference frequency (REF. 1). Then the one or more lower receiving systems are connected to the summing junction by closing the switch 52. The carrier phase noise fed from the lower receiving system into the summing junction is small because of much narrower closed loop noise bandwidths relative to the phase noise error on the first local oscillator (output of frequency multiplier 36) in the upper system. Consequently, the carrier signals of the upper and lower receiving systems fed into the summing junction are coherent with a small differential phase jitter. However, their receiver noise voltages fed into the summing junction are statistically independent.

The foregoing has been addressed to the rms phase noise at the output of the RF carrier tracking loop (first local oscillator signal) in the upper receiving system due to the predetection carrier signal-to-noise ratio for two or more arrayed receiving systems. Inspection of FIG. 4 indicates that an additional phase noise at the output of the carrier tracking loop in the lower receiving system coupled into the summing junction must also be considered for lower receiving systems arrayed. Since the closed loop noise bandwidths of the carrier tracking loop in the upper receiving system is much wider than that in the lower receiving system, the phase noise at the output of filter 22 is tracked by this wider phase tracking loop and consequently appears as an extremely small error signal at the output of the summing junction. As a result, the carrier signal-to-noise power ratio is improved according to the number of receiver systems included as shown in FIG. 5.

Referring now to the carrier phase tracking loop in the lower system, the closed loop noise bandwidth is much narrower than the tracking loop in the upper system. Also the carrier tracking loop in the lower system is a second order loop which also utilizes a band pass limiter 24 and a sinusoidal phase detector 28.

Figure 5:
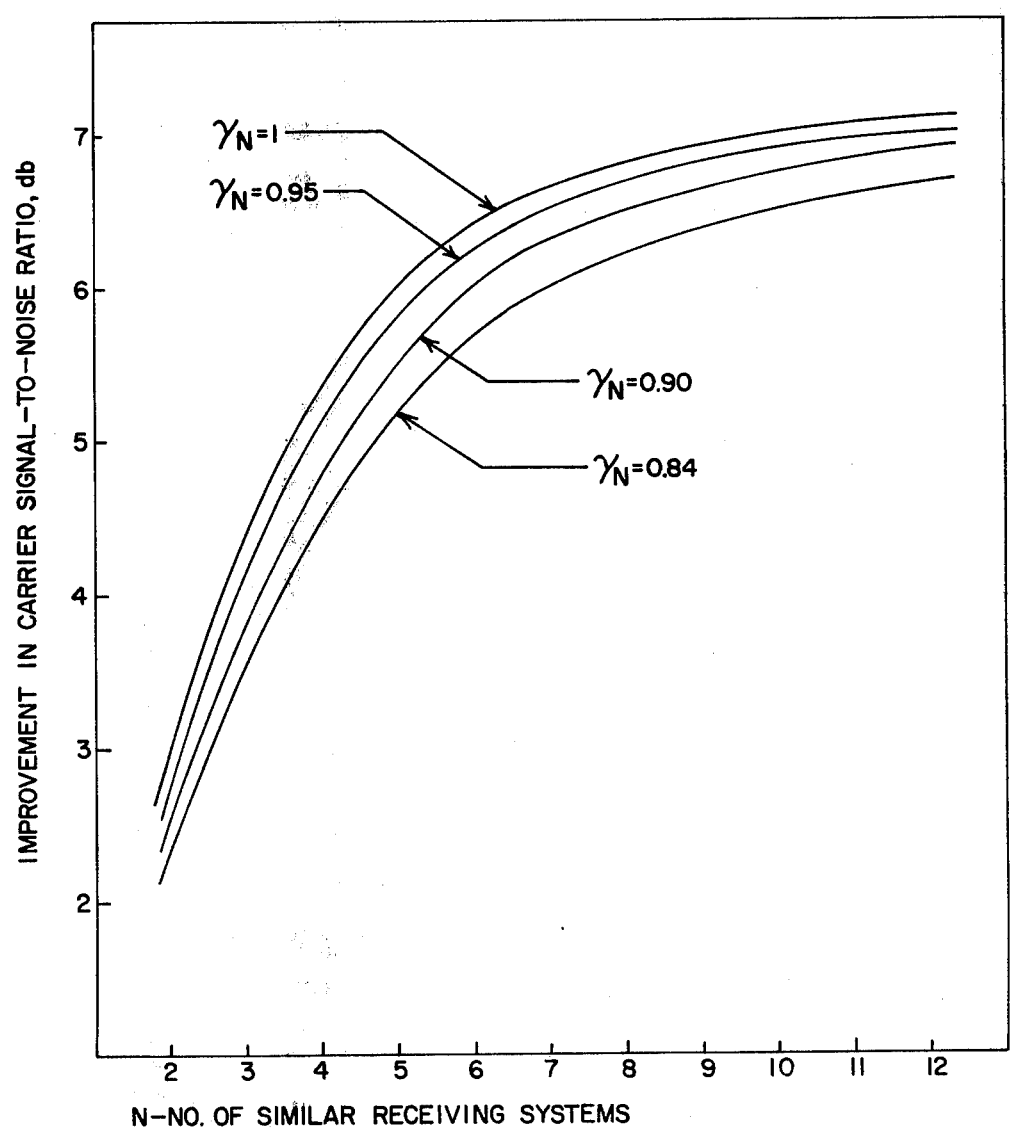
FIG. 5 is a graph illustrating signal-to-noise ratio improvement for radio frequency carrier arraying for high rate telemetry reception in the system of FIG. 4.
Figure 6:
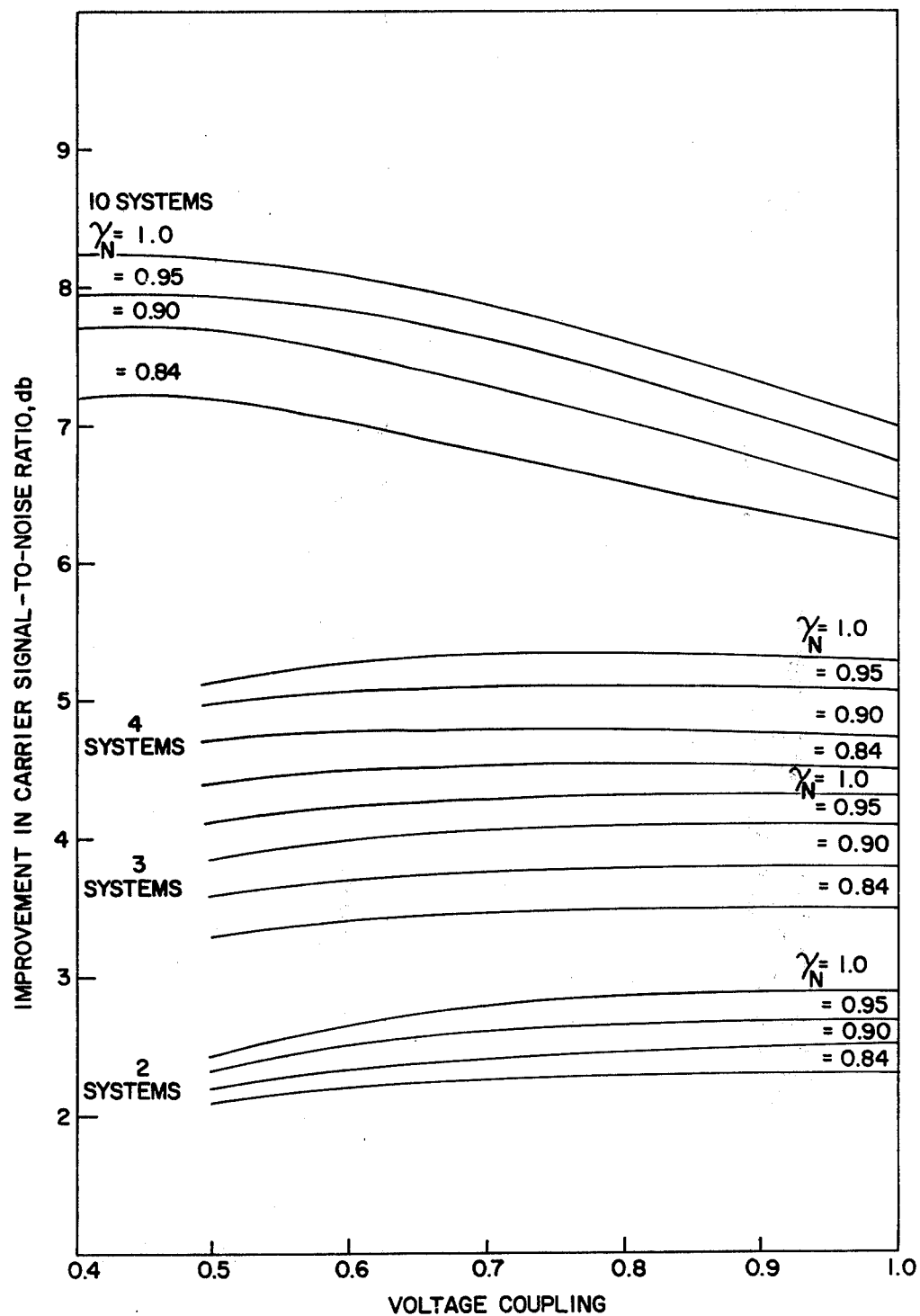
FIG. 6 is a graph illustrating the effect of summing junction voltage coupling on carrier signal-to-noise ratio improvement in the system of FIG. 4.

FIG. 5 shows the carrier signal-to-noise ratio improvement resulting from arraying a number N of similar systems for high rate telemetry reception. Performance is shown for carrier power-to-noise spectral density ratio $\gamma_N^2$ of receiving system N relative to receiving system 1 with summing junction voltage coupling equal to $\gamma_N$. The greater the coupling factor and $\gamma_N$, the greater the improvement. FIG. 6 shows the effect on carrier signal-to-noise ratio improvement for $\gamma_N$ values of 1.0, 0.95, 0.90, and 0.84 when voltage coupling is varied. Performance is shown for two, three, four and ten receiving systems arrayed for high rate telemetry. The effect of the carrier phase noise from the lower systems 2 through N coupled into the upper receiving system RF tracking loop can be seen in FIG. 6. This effect becomes more apparent as the number of systems arrayed is increased. Note that for ten systems arrayed, reducing the coupling from unity results in an increase in carrier signal-to-noise ratio improvement.

Figure 7:
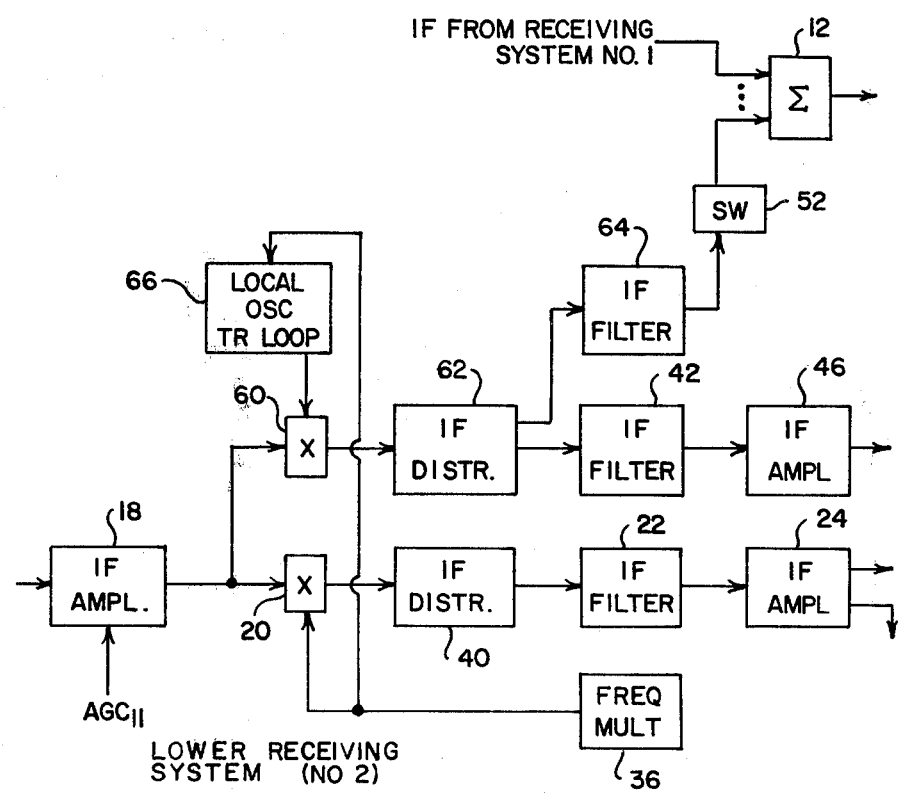
FIG. 7 is a block diagram of a variant from the embodiment of FIG. 4 for low or high rate telemetry reception and radiometric tracking.

A second exemplary embodiment will now be described with reference to FIG. 7 for near maximum carrier signal-to-noise ratio improvement at either high or low rate telemetry reception and radiometric tracking. The upper receiving system (the number 1 or master system) is the same as in the embodiment of FIG. 4, and the lower systems (the slave systems) are the same as in the embodiment of FIG. 4 except that section from the output of the first IF amplifier 18 and the inputs to the summing junction, IF amplifier 24 and IF amplifier 46. Consequently only that section is shown in FIG. 7. It includes a separate mixer 60 and IF distribution amplifier 62 feeding the IF filter with the carrier signal spectrum that is to be converted to the telemetry subcarrier (with data) spectrum through the IF amplifier 46 and mixer 48 (FIG. 4). It also includes a separate IF filter 64 coupling the carrier signal to the summing junction. And most important, it includes a narrow-band phase locked local oscillator tracking loop 66.

Although the noise on the phase estimate of the second local oscillator signal to the lower second mixer 20 is much less than that on the first local oscillator signal from the frequency multiplier 36 in the upper system (FIG. 4), the effect of the noise on phase estimates at the same point in other systems is cumulative (in an rms sense) in the summing junction when arraying more than two receiving systems. This cumulative phase noise is kept small relative to the phase noise on the first local oscillator signal by including the second (upper) mixer 60 with the second local oscillator fed to this additional second mixer through the narrow-band phase locked local oscillator tracking loop. The phase noise on the output of this local oscillator tracking loop is small compared to the phase noise at its input.

This embodiment uses two IF distribution amplifiers. The additional (upper) amplifier 62 accepts the output of the upper second mixer 60 and in turn provides its output to the added (upper) IF filter 64 (and to the telemetry IF channel). All of these additions over the embodiment of FIG. 4 provide near maximum signal-to-noise ratio improvement for RF carrier arraying.

By design the two second IF filter 22 and 64 have the same noise bandwidth as the filter 22 in the upper receiving system (FIG. 4). The signal at the output of the added IF filter 64 is provided as an input to the summing junction. The signal at the output of the filter 42 connected to the added distribution amplifier is provided to the telemetry IF channel as before in the embodiment of FIG. 4 where it is connected to the distribution amplifier 40. This arrangement provides improved signal-to-noise ratio for low rate as well as high rate telemetry reception and radiometric tracking at the expense of only these few added components.

Figure 8:
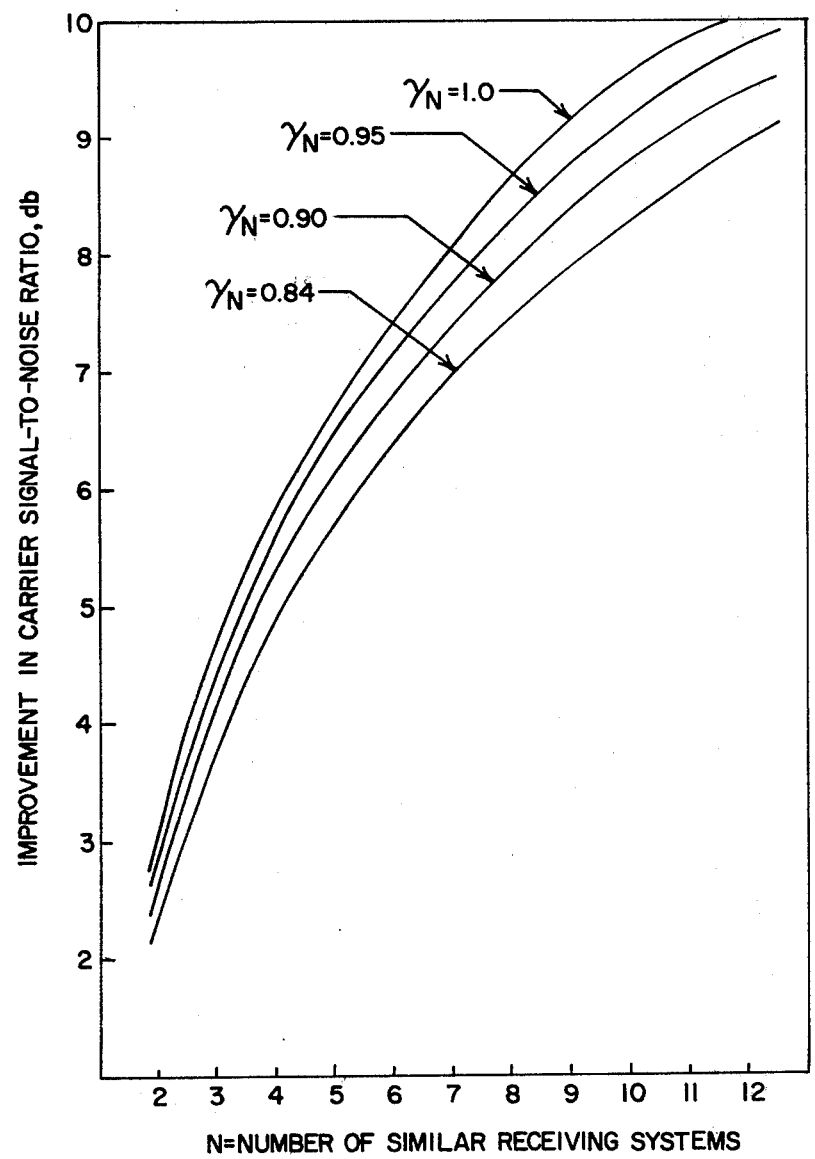
FIG. 8 is a graph illustrating signal-to-noise ratio improvement for the variant of FIG. 7.
Figure 9:
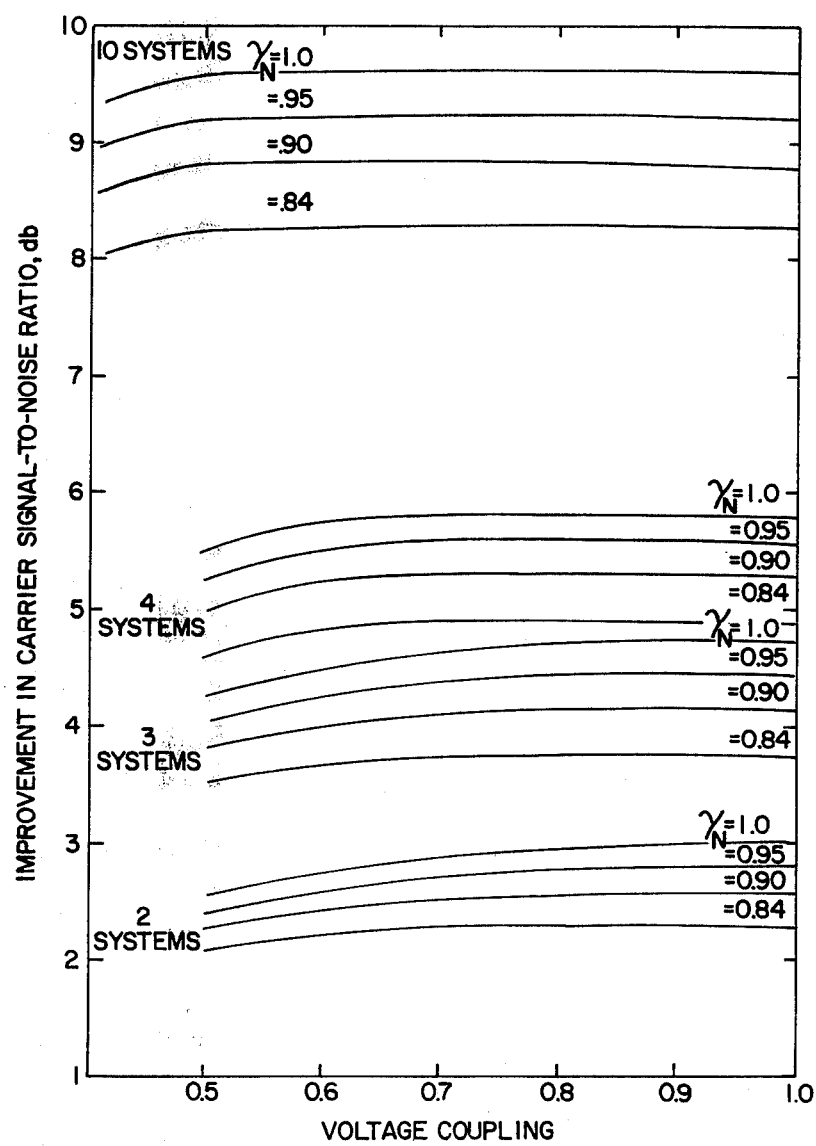
FIG. 9 is a graph illustrating the effect of summing junction voltage coupling on carrier signal-to-noise ratio improvement in the variant of FIG. 7.

FIG. 8 shows the carrier signal-to-noise improvement which results from arraying N receiving systems for comparison with the improvement which results from the embodiment of FIG. 4 as shown in FIG. 5. Note that for 10 receiving systems arrayed, the improvement in carrier signal-to-noise ratio is 9.6 db compared to 7.0 db for the embodiment of FIG. 4. The effect of varying the voltage coupling of different numbers of lower receiving systems arrayed into the summing junction relative to the upper (master) receiving system is shown in FIG. 9. Note that the voltage coupling can vary considerably with a small resultant change in performance for any number of lower systems. This is particularly significant for 10 systems, as compared to the results shown in FIG. 6 for 10 systems in the embodiment of FIG. 4.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A method for arraying a plurality of receiving systems coupled to one or more antennas for coherent frequency reception, each receiving system having a first IF mixer and a second IF mixer, comprising the steps of carrier frequency tracking in one receiving system utilizing a phase-lock loop to control the frequency of a first local oscillator for the first IF mixer thereof, and using the output of said first local oscillator as the local oscillator for the first IF mixer of each of the remaining systems, carrier phase tracking in each of said remaining receiving systems relative to said one receiving system at IF frequency using a constant reference frequency for the second IF mixer in said one receiving system, and in each remaining system using a phase-lock loop to control the frequency of a second local oscillator for the second IF mixer thereof, and summing of the second IF signals in all of said remaining receiving systems with the second IF signal in said one receiving system.

2. A method as defined in claim 1 including making a separate and fixed phase shift adjustment in the carrier phase tracking loop of each remaining receiving system to cancel differential RF carrier phase due to any group delay in its antenna coupling.

3. A method as defined in claim 1 wherein said receiving systems are two in number coupled to one antenna, a first receiving system for right circular or vertical linear polarization and a second receiving system for left circular or horizontal linear polarization diversity reception, thereby to effectively provide the same signal-to-noise ratio for both polarizations that would result from matched polarization.

4. A method as defined in claim 1 for high rate telemetry reception including the steps of setting the signal level of the summed second IF signals in the one receiving system to provide the required level for the telemetry subcarrier spectrum of the one receiving system with respect to the other systems, adjusting the closed loop noise bandwidth of the remaining receiving systems to compensate for low carrier signal-to-noise ratio relative to the one receiving system and including a distribution amplifier in each receiving system to feed the output of the second IF mixer to the tracking loops of each respective receiving system and in at least one system to a separate telemetry subcarrier channel of broad bandwidth.

5. A method as defined in claim 4 for low or high rate telemetry reception including maintaining the low threshold of the array utilizing a filter operating at a fixed narrow-band noise bandwidth in each of said remaining receiving systems for reducing the phase noise in the summing of the second IF signals in all of said remaining receiving systems with the second IF signal in said one receiving system.

6. A method as defined in claim 5 wherein said filter is comprised of an additional second IF mixer in each of said remaining receiving systems and a narrow-band local oscillator tracking loop feeding the second local oscillator signal to said additional second mixer, and summing the output of said second mixer in each of said remaining receiving system with the output of the second mixer of said one receiving system.

7. A method for increasing the sensitivity of a receiving facility for coherent radio frequency reception by arraying a plurality of receiving systems which receive a modulated carrier signal from the same or separate antennas, operating one of the arrayed systems as a master with a carrier tracking loop to provide to a first heterodyne mixer in each of said plurality of receiving systems a first local oscillator frequency used to produce a first IF signal in each system, operating each of said plurality of systems except the first with individual tracking loops at the first IF to provide a second local oscillator frequency to a second heterodyne mixer for producing a second IF signal in each system while the master receiving system is operated with a first fixed reference signal to be mixed with the first IF to produce the second IF, and using a separate adjustable phase shifter for adjustment of the second local oscillator frequency in each of the other systems arrayed to compensate for differences in group delay of the received signal through the receiving antenna and preamplifier coupling into the first mixer, thereby to provide second IF signals that are in phase, and summing the second IF signals of all systems with the second IF signal of the first system.

8. A method as defined in claim 7 wherein said receiving facility is for polarization diversity reception from a single antenna with its associated feed, and only two systems are arrayed, one for polarized reception of one sense or angle, and a second one for polarized reception of another sense or angle, and wherein a selected one of the two systems is operated as the master with a carrier tracking loop, and the other with a tracking loop operating at said first IF.

9. A method as defined in claim 7 for high rate telemetry reception including the step of setting the signal level of the summed IF signals in the master system to provide the required level for the telemetry subcarrier spectrum of the master receiving system with respect to the other systems arrayed, narrowing the closed loop bandwidth of the other systems to compensate for low carrier signal-to-noise ratio relative to the master system, and including a distribution amplifier to feed the second IF signal to the tracking loops of each respective receiving system and to a separate telemetry subcarrier channel of broad bandwidth in each receiving system.

10. A method as defined in claim 9 for low or high rate telemetry reception including maintaining the low threshold of the arrayed receiver systems, and including a local oscillator tracking loop operating at a fixed bandwidth of 0.01 of the threshold noise bandwidth of the master in each of the other receiving systems for reducing the phase noise at the summing junction, thereby preserving the master receiving system threshold as the combined receiving system threshold, said local oscillator tracking loop being effected through a seocnd mixer into the distribution amplifier, while the IF signal produced by the phase tracking loop of the receiver system is passed through a matching group delay amplifier.

11. A radio frequency receiving facility moving a plurality of receiving systems coupled to one or more antennas for coherent frequency reception, each receiving system having a first IF mixer and a second IF mixer, comprising:

means for carrier frequency tracking in one receiving system utilizing a phase-lock loop to control the frequency of a first local oscillator for the first IF mixer thereof, means for using the output of said first local oscillator as the local oscillator for the first IF mixer of each of the remaining systems, means for carrier phase tracking in each of said remaining receiving systems relative to said one receiving system at IF frequency using a constant reference frequency for the second IF mixer in said one receiving system, and in each remaining system using a phase-lock loop to control the frequency of a second local oscillator for the second IF mixer thereof, and means for summing of the second IF signals in all of said remaining receiving systems with the second IF signal in said one receiving system.

12. A radio frequency receiving facility as defined in claim 11 including means for making a separate and fixed phase shift adjustment in the carrier phase tracking loop of each remaining receiving system to cancal differential RF carrier phase due to group delay in its antenna coupling.

13. A radio frequency receiving facility as defined in claim 11 wherein said receiving systems are two in number coupled to one antenna, a first receiving system for right circular or vertical linear polarization and a second receiving system for left circular or horizontal linear polarization diversity reception, thereby to effectively provide the same signal-to-noise ratio for both polarizations that would result from matched polarization.

14. A radio frequency receiving facility as defined in claim 11 for high rate telemetry reception including
means for setting the signal level of the summed second IF signals in the one receiving system to provide the required level for the telemetry subcarrier spectrum of the first receiving system with respect to the other systems,
means for adjusting the closed loop noise bandwidth of the remaining receiving systems to compensate for low carrier signal-to-noise ratio relative to the one receiving system, and
a distribution amplifier in each receiving system to feed the output of the second IF mixer to the tracking loops of each respective receiving system and to a separate telemetry subcarrier channel of broad bandwidth in each receiving system.

15. A radio frequency receiving facility as defined in claim 14 for low or high rate telemetry reception including means for maintaining the low threshold of the array utilizing a filter operating at a fixed narrow-band noise bandwidth in each of said remaining receiving systems for reducing the phase noise in the summing of the second IF signals in all of said remaining receiving systems with the second IF signal in said one receiving system.

16. A radio frequency receiving facility as defined in claim 15 wherein said filter is comprised of an additional second IF mixer in each of said remaining receiving systems and a narrow band local oscillator tracking loop feeding the second local oscillator signal to said additional second mixer, and means for summing the output of said second mixer in each of said remaining receiving system with the output of the second mixer of said one receiving system.

17. In a facility for coherent radio frequency reception, a plurality of receiving systems which receive a modulated carrier signal from the same or separate antennas, apparatus for combining said receiving systems to increase the sensitivity of said facility for coherent radio frequency reception, comprising
a carrier frequency tracking loop in one of said receiving systems to provide to a first heterodyne mixer in each of said plurality of receiving systems a first local oscillator frequency used to produce a first IF signal in each receiving systems,
a separate carrier phase tracking loop in each of said one to provide a second local oscillator frequency signal to a second heterodyne mixer for producing a second IF signal in each receiving system in phase with a second IF signal in said one receiving system produced in a second heterodyne mixer thereof by beating with a fixed reference frequency signal,
means for separately adjusting the phase of said second local oscillator frequency in each of said receiving systems except said one system to compensate for difference in group delay of the received signal relative to the group delay of the received signal in said one receiving system, and
means for summing the second IF signals of all of said receiving systems with the second IF signal in said one receiving system.

18. Apparatus as defined in claim 17 wherein said receiving facility is for polarization diversity reception from a single antenna with its associated feed, and only two systems are arrayed, one for polarized reception of one sense or angle, and a second one for polarized reception of another sense or angle, and wherein a selected one of the two systems is operated as the one with a carrier frequency tracking loop, and the other with a carrier phase tracking loop operating at said first IF.

19. Apparatus as defined in claim 17 for high rate telemetry reception including
means for setting the signal level of the summed IF signals in the one receiving system to provide the required level for the telemetry subcarrier spectrum of said one receiving system with respect to the other receiving systems arrayed,
means for narrowing the closed loop bandwidth of the other systems to compensate for low carrier signal-to-noise ratio relative to the master system, and
a distribution amplifier to feed the second IF signal to the tracking loops of each respective receiving system and to a separate telemetry subcarrier channel of broad bandwidth in each receiving system.

20. A apparatus as defined in claim 19 for low or high rate telemetry reception including means for maintaining the low threshold of the arrayed receiver systems, and including a local oscillator tracking loop operating at a fixed bandwidth of 0.01 of the threshold noise bandwidth of said one receiving system in each of the other receiving systems for reducing the phase noise at the summing means, thereby preserving threshold of one receiving system as the combined receiving system threshold, said local oscillator tracking loop being effected through a second mixer into said distribution amplifier, while the IF signal produced by the phase tracking loop of the receiver system is passed through a matching group delay amplifier.

* * * * *